United States Patent [19]

Triebel et al.

[11] 4,125,669

[45] Nov. 14, 1978

[54] BULLETPROOF LAMINATED SAFETY GLASS AND PROCESS FOR PRODUCTION

[75] Inventors: Wolfgang Triebel, Hanau; Siegfried Hari, Klein-Welzheim; Hubbert Koert, Hanau; Fritz Evers, Münster, all of Germany

[73] Assignee: Deutsche Gold-und Silber-Scheideanstalt Vormals Roessler, Frankfurt am Main, Germany

[21] Appl. No.: 768,800

[22] Filed: Feb. 15, 1977

[30] Foreign Application Priority Data

Feb. 19, 1976 [DE] Fed. Rep. of Germany ....... 2606569

[51] Int. Cl.$^2$ ............................................. B32B 27/36
[52] U.S. Cl. ...................... 428/412; 156/99; 156/332; 428/429; 428/442; 428/520; 428/522; 428/911
[58] Field of Search ................. 156/99, 102, 332, 329, 156/327; 89/36 A, 36 L; 428/412, 426, 428, 430, 431, 442, 520, 911, 515, 522; 526/46, 48, 57, 135, 146

[56] References Cited

U.S. PATENT DOCUMENTS

| | | | |
|---|---|---|---|
| 3,520,768 | 7/1970 | Peilstöcker | 428/332 |
| 3,539,442 | 11/1970 | Buckley et al. | 428/412 |
| 3,622,440 | 11/1971 | Snedeker et al. | 428/429 |
| 3,624,238 | 11/1971 | McKenzie | 428/429 |
| 3,666,614 | 5/1972 | Snedeker et al. | 428/412 |
| 3,671,370 | 6/1972 | Littell, Jr. | 156/99 |
| 3,700,534 | 10/1972 | Cook | 428/911 |
| 3,867,222 | 2/1975 | Plant | 428/430 |
| 4,032,487 | 6/1977 | Columbus | 428/442 |

*Primary Examiner*—Douglas J. Drummond
*Assistant Examiner*—Michael W. Ball
*Attorney, Agent, or Firm*—Beveridge, DeGrandi, Kline & Lunsford

[57] ABSTRACT

Laminated safety glass wherein the adhesive binder used contains at least 50% by weight of 2-ethylhexyl-methacrylate, 0.2 to 2% by weight of the binder of at least one alkylacyl peroxide and 0.005 to 0.5% by weight of the binder of at least one compound which contains a labile halogen atom, as solution in a phlegmatization agent, 0.01 to 10 ppm $Cu^{++}$-ions in the form of a copper salt soluble in the binder and 0.05 to 3% by weight of the binder of a $\omega$-mercaptoalkyltrialkoxy silane.

16 Claims, No Drawings

BULLETPROOF LAMINATED SAFETY GLASS AND PROCESS FOR PRODUCTION

The invention relates to laminated safety glass and to a process for the production thereof.

Bulletproof laminated safety glasses of varied types have been described in the past. Customarily these products are formed of transparent materials of different compositions. For example, the individual panes or sheets may consist of a silicate glass or a high molecular weight thermoplastic polycarbonate. Usually a relatively thick pane made of the polycarbonate is combined with at least one relatively thin pane made of silicate glass. In order to achieve a sufficient bulletproof strength, a considerable thickness of the total combination is required, as a result of which the possibilities of uses and applications of such thick and heavy panes are greatly limited.

It is also known to combine individual panes of the same or different transparent material by using an adhesive layer which is a methacrylate syrup cured in situ. Depending on the composition however, either the syrups or the adhesive layers produced from them by hardening give rise to several problems. For example, synthetic glass panes may become milky or cloudy or may lose their strength. Delamination may also result when the intermediate layers separate from the individual panes. Also the resistance to temperature change particularly of the larger surfaces of the laminated safety glass is entirely insufficient.

Accordingly, it is the object of the invention to provide bulletproof laminated safety glass which is formed of:

(1) a silicate glass pane of at least 6 mm thickness or an acrylic glass pane of at least 12 mm thickness, and (2) a polycarbonate pane of at least 1.5 mm thickness.

The silicate glass pane or acrylic glass pane is provided for the surface of the panel which is subjected to bombardment and the polycarbonate pane is provided for the reverse side of the laminated panel. An adhesive layer is provided for bonding the two panes together and which layer is produced in situ by hardening of a binder composition which contains at least 50% by weight of 2-ethylhexylmethacrylate, 0.2 to 2.0% by weight of the binder of at least one alkylacyl peroxide and 0.005 to 0.5% by weight of the binder of at least one compound which contains a labile halogen atom, as solution in a phlegmatization agent, 0.01 to 10 ppm $Cu^{++}$ - ions in the form of a copper salt soluble in the binder and 0.05 to 3% by weight of the binder of a ω-mercaptoalkyltrialkoxy silane. The in situ reaction takes place at temperatures between +10 and +50° C.

Laminated safety glass according to the invention is bulletproof against at 9 mm caliber parabellum pistol, whenever, a silicate glass pane of 6 mm thickness or an acrylic glass pane of 12 mm thickness is combined with a polycarbonate pane of 2 mm thickness. A bulletproof condition against 357 caliber magnum will be achieved by a combination of a silicate glass pane of 10 mm thickness or an acrylic glass pane of 25 mm thickness with a polycarbonate pane of 2 mm thickness. A combination of a silicate glass pane of 12 mm thickness and a polycarbonate glass pane of 3 mm thickness is bulletproof against 44 caliber magnum. A combination of a commercial laminated safety glass made of 2 × 12 mm silicate glass and a polycarbonate pane of 4 mm thickness will even resist bombardment with a long-range gun G 3 of 7.62 × 51 caliber.

As a result of the combination of all of the above mentioned features, namely (1) arrangement of a relatively thick individual pane made of silicate glass or acrylic glass on the side of the laminated panel exposed to bombardment and of a pane of polycarbonate which, in comparison with the former, is thinner, on the reverse side of the laminated panel, (2) use of a binder composition which contains at least 50% by weight of 2-ethylhexylmethacrylate for the production of an adhesive layer for bonding the individual panes together, (3) hardening or curing of the binder composition in the presence of a very special catalyst system and a ω-mercaptoalkyltrialkoxy silane; and (4) carrying out the hardening reaction in a particular temperature range, bulletproof laminated safety glass is obtained with particularly desirable characteristics. As compared with known bulletproof glasses, the products produced by the invention result in considerable saving in total thickness and/or weight without sacrificing strength against bombardment. The binder composition of the invention does not attack acrylic glass or polycarbonate. The hardened adhesive layer adheres quite extraordinarily strongly to the individual panes of the combination. The laminated safety glass panes, even those having very large surface areas, demonstrate an excellent resistance to adverse effects caused by temperature changes.

Whenever silicate glass is to be used on the side of the laminated panel to be subjected to bombardment, then generally it will not be effective to use individual panes with a thickness of more than 20 mm. Insofar as performance requirements for actual installation may demand a thicker layer made of silicate glass, it will be more advantageous in most cases to use a laminated safety glass made of several silicate glass panes. For example, a laminated safety glass made of 2 × 20 mm silicate glass, the overall thickness of which amounts to about 40 mm, should satisfy all requirements.

Whenever acrylic glass is to be used on the side of the laminated panel to be subjected to bombardment, then this generally will be effective only whenever the requirements made may be satisfied by an acrylic glass pane of 30 mm maximum, preferably 25 mm maximum thickness. Whenever the thickness of the acrylic glass pane is chosen larger, the laminated safety glass becomes increasingly awkward, so that it is recommended to replace the acrylic glass pane with a silicate glass pane of less thickness. The term "acrylic glass" in the present context is intended to mean a homopolymer of methylmethacrylate or a copolymer of predominantly methylmethacrylate with small quantities of other copolymerizable monomers.

The polycarbonate pane to be used for the reverse side of the laminated combination; i.e., the side away from potential hazard, is to have a thickness of 1.5 to 5 mm, preferably of 2 to 4 mm. The term "polycarbonate" in the present context is intended to mean a high molecular weight thermoplastic polycarbonate, especially a polycarbonate formed from dihydroxydiarylalkanes. These are substances well known in the art.

The silicate glass pane or the acrylic glass pane and the polycarbonate pane are laminated together using an adhesive layer of at least 0.1 mm, perferably at least 0.5 mm thickness. The upper limit for the thickness of the adhesive layer is governed essentially by economic reasons and is about 5 mm. Preferably, the thickness of the adhesive layer is at about 3 mm, especially at about 1.5 mm. The adhesive layer consists of a hardened binder which contains, in the unhardened state, at least 50% by weight, related to the total weight of the binder, of 2-ethylhexylmethacrylate. The hardened condition of the adhesive layer is produced by curing in situ. It is particularly advantageous to produce the adhesive layer by curing a binder composition of the following composition:

(a) 98.9 to 77% by weight of a methacrylate syrup containing on the basis of the total weight of the methacrylate syrup.

65 to 85% by weight of 2-ethylhexylmethacrylate,
    5 to 20% by weight of 2-ethylhexylacrylate,
    5 to 20% by weight of 2-hydroxypropylacrylate,
    0 to 5% by weight of other alkyl esters of the acrylic and/or methacrylic acid,
    0.1 to 3% by weight of acrylic and/or methacrylic acid; and
    0.05 to 0.5% by weight of at least one of a conventional chain transmitter containing mercapto groups for the polymerization of methacrylic monomers; which contains about 20 to 45% of the above mentioned monomers in a polymeric form;

(b) 1 to 20% by weight of at least one conventional exterior plasticizer for methacrylate resins and (c) 0.1 to 3% by weight of at least one conventional cross linking agent for methacrylate resins, whereby the components (a) to (c) always must add up to 100% by weight.

The component (a) of the binder is composed of
    65 to 85% by weight, preferably 70 to 80% by weight, of 2-ethylhexylmethacrylate;
    5 to 20% by weight, preferably 7.5 to 17.5% by weight of 2-ethylhexylacrylate;
    5 to 20% by weight, preferably 7.5 to 17.5% by weight of 2-hydroxypropylacrylate;
    0 to 5% by weight of other alkyl esters of the acrylic and/or methacrylic acid;
    0.1 to 3% by weight, preferably 1 to 2% by weight of acrylic and/or methacrylic acid; and
    0.05 to 0.5% by weight, preferably 0.1 to 0.4% by weight of at least one chain transmitter containing mercapto groups, for the polymerization of methacrylic compounds;

and contains about 20 to 45% of the above mentioned monomers in a polymeric form. At the same time however, it is not necessary that the dissolved polymerizate contains units derived from all the above mentioned monomers. Naturally however in every case all components of the methacrylate syrup must add up to 100% by weight.

Examples for the remaining alkyl esters of the acrylic and/or methacrylic acid which must also be used in amounts up to 5% by weight, are particularly methylmethacrylate, but also n-butylmethacrylate, isobutylmethacrylate, cyclohexylmethacrylate, furfurylmethacrylate, allylmethacrylate, methylacrylate, ethylacrylate, n-butylacrylate or cyclohexylacrylate.

Examples of the known chain transmitters and containing mercapto groups for the polymerization of methacrylic compounds are straight chain or branched chain alkylmercaptans, such as n-butylmercaptan, n-octylmercaptan, n-dodecylmercaptan or tert. dodecylmercaptan, and the esters of the mercapto acetic acid (thioglycolic acid) with mono or multivalent alcohols, such as n-butanol, n-octanol, n-dodecanol, tert. dodecanol, cyclohexanol, ethyleneglycol, 1,4-butandiol, neopentylglycol, glycerin, trimethylol propane or pentaery-thritol. n-octylmercaptan and particularly glycoldimercaptoacetate are preferred.

The polymerizate contained in a dissolved form in the methacrylate syrup serves among other things for the purpose of providing the completed binder with a consistency or viscosity suitable for processing. Whenever the methacrylate syrup has a polymer content of about 20 to about 45%, the viscosity of the completed binder at −20° C. is about 10 to about 1000 cP. A viscosity between 20 and 200 cP is preferred for practicing the invention.

Examples of exterior plasticizers for methacrylate resins are known and include the esters of phthalic acid, adipic acid, sebacic acid, or citric acid with alkanols; e.g., dimethylphthalate, dibutylphthalate, dioctylphthalate, dioctyladipinate, dioctylsebacinate and the particularly preferred acetyl tributyl citrate.

Examples of cross linking agents for methacrylate resins are known and are used in quantities of 0.1 to 3% by weight, preferably of 1 to 2% by weight. Particularly suitable are the multivalent esters of methacrylic acid or acrylic acid with multivalent alcohols, such as ethylene glycol dimethacrylate, 1,4-butandiol dimethacrylate, 1,6-hexandiol dimethacrylate, neopentylglycol dimethacrylate, diethylene glycol dimethacrylate, trimethylol propane trimethacrylate, pentaerythritol trimethacrylate or pentaerythritol tetramethacrylate. Especially preferred is triethylene glycol dimethacrylate.

The methacrylate syrup (component a) of the binder may be produced in such a way that the total quantity of the monomers, after addition of the chain transmitter is subjected in the presence of a known radical catalyst, preferably azodiisobutyric acid dinitrile, in a known manner at increased temperature to a partial polymerization until the desired polymer content of the syrup is reached. Then the syrup is cooled down and mixed with a small quantity, e.g., 10 to 200 ppm, preferably 25 to 100 ppm, of a known inhibitor for radical polymerization, e.g., 2,4-dimethyl-6-tertiary-butylphenol, hydroquinone or hydroquinone monomethyl ether.

It is simpler and therefore to be preferred whenever only a part of the monomers are subjected, after the addition of a chain transmitter, to the partial polymerization until a relatively high viscosity of the prepolymerizate is reached. The cool down prepolymerizate mixed with the inhibitor is then diluted with the residue of the monomers to the desired polymer content.

The production of the syrup or of the prepolymerizate is accomplished effectively with a heating jacket, reflux cooler, thermometer, agitator and a kettle provided with an additional inlet opening.

The starting materials are charged to the reactor vessel in such a quantity that the contents do not exceed 70% of the volume of the kettle. The contents of the kettle are heated to a temperature between about 60° and 100° C., preferably about 75° C., and are mixed with the catalyst. By constant stirring with a moderate stirring speed, one will be able to achieve a homogeneous course of reaction. After a few minutes, the polymerization starts and the inside temperature of the kettle rises to about 100° to 140° C. because of the exothermic reaction. Whenever the desired polymer contents of the syrup or the desired viscosity of the prepolymerizate has been reached, the reaction is stopped by outside cooling and is stabilized with the polymerization inhibitor. The time from the addition of the catalyst up to the halting of the reaction amounts to about 20 to 60 minutes, depending on the desired polymer content or the desired viscosity. Preferably the polymerization is accomplished during about 40 to 50 minutes.

The methacrylate syrup produced according to one of the two methods described is mixed with the components (b) plasticizer and (c) cross linking agent to form the completed binder. According to choice, the copper salt, required for the later hardening, may also be added already to the binder without thereby impeding the storage life. However, it is also possible to mix the copper salt into the binder just prior to the processing together with other additives required for the hardening.

Copper salts especially suitable for the process according to the invention are copper naphthenate and copper octoate. Most effectively the copper salt is used as a solution in the monomeric methylmethacrylate, 2-ethylhexylmethacrylate, 2-ethylhexylacrylate or 2-hydroxypropylacrylate.

Only directly prior to the processing will it be possible to incorporate into the binder the other additives needed for the hardening. These other additives include 0.2 to 2.0% by weight of at least one alkylacylperoxide and 0.005 to 0.5% by weight of at least one compound which contains a labile halogen atom, preferably a chlorine atom. All weight is by weight of the binder. These two components of the catalyst system are used as a solution in a phlegmatizing agent.

Examples for suitable alkylacylperoxides are tert. butyl perbenzoate, tert. butyl peroctoate, tert. butyl peracetate, tert. butyl periso butyrate or ter. butyl perisononanate.

Examples for suitable compounds which contain a labile halogen atom are amine hydrochlorides or quarternary ammonium chlorides, such as phenylethyldibutyl amine-hydrochloride, tolylethyldibutylamine-hydrochloride, dibutylamine-hydrochloride, triethylammonium acetic acid ethylester chloride or phenylethyl dibutylammonium acetic acid ethylester chloride, soluble in the binder.

Examples for suitable phlegmatizing agents are the customary plasticizers such as dimethylphthalate, dibutylphthalate, dioctylphthalate or dioctyladipinate. The concentration of the alkylacylperoxide and the compound which contains a labile halogen atom, together with the phlegmatizing agent, may for example amount to about 40 to 50% by weight.

Furthermore, and in addition, again related to the weight of the binder 0.05 to 3% by weight, preferably 0.1 to 1% by weight of a ω-mercaptoalkyl-trialkoxy silane, such as Γ-mercaptopropyl-trimethoxy silane or Γ-mercaptopropyl-triethoxy silane are added to the binder just prior to processing.

The hardening of the binder is accomplished in situ i.e., between the individual panes that are to be combined at a temperature between $+10$ and $+50°$ C., preferably between $+20$ and $+30°$ C. in the presence of all the mentioned additives required for the hardening.

The individual panes that are intended to be adhesively combined into a laminate are cut to the desired size as far as necessary, and cleaned dust free with suitable cleaners, for example, an isopropyl alcohol/water mixture. Before placing them in adhering relationship they must be well dried.

As a protection against scratching, the polycarbonate pane that is to be used may be provided with a scratchproof, clearly transparent coating only a few microns thick, on the side which will later be the exterior surface. This coating may be produced either by vapor deposition of mineral substances such as silicon monoxide or dioxide, metal oxides or metal fluorides, or by application and subsequent hardening at an elevated temperature of a glass like silicon resin being in solution or of an acid-hardening, urea-melamine resin. However, a thin foil or pane made of silicate glass may be adhered on or laminated onto the polycarbonate pane just as well.

The polycarbonate pane is placed with its surface, which will later be the exterior surface, facing downwards onto a cushioned, tiltable worktable. About 3 mm from its edge the polycarbonate pane is coated with a soft rubber elastic profile band or boundary, preferably round, flat or hose material made of soft PVC, silicon rubber or other polymers. A round band made of a mixed polymerizate, the composition of which corresponds approximately to that of the binder to be used, but which contains no cross linking agent, is particularly suitable. The diameter of the soft band or boundary material depends on the desired thickness of the adhesive layer. It is selected depending on the softness, about 50 to 100% thicker, since the profile or boundary is compressed later on during clamping of the laminated package. On one corner, a piece of the pane at the edge remains free and not coated in the manner described, so as to enable the inserting of filling apparatus such as flat foil hoses, nozzles or funnels. The silicate glass pane or the acrylic glass pane is now put on, having the same size. A chamber is formed between the two individual panes which is closed all around by the band or profile material except for the opening left for filling purposes. If need be, a second opening can be provided on the same side serving for aeration. The laminated package is compressed all around with clamping strips or clamps until the desired thickness of the composite has been reached. The binder requirements can be calculated using the following formula:

$$M = \left[ L \times B \times H + \frac{L \times B \times H}{10} \right] \times \gamma$$

M = resin supply (kg)
L = length of the chamber (m)
B = width of the chamber (m)
H = height, respectively thickness of the chamber (mm)
γ = specific weight of the binder The tilting table is put into a slanting, up to a perpendicular, position of about 30° to 90°, preferably of about 60° to 90°. The binder mixed with all its additives and aerated by a short evacuation is continuously filled by means of a filling apparatus. An example of a filling apparatus is an approximately 5 to 20 cm wide, flat polyethylene hose with a funnel attachment. After about 5 to 10 minutes, any enclosed air bubbles have escaped. The table is slowly put into horizontal position. In doing so, the resin flows free of bubbles into the filling opening. The latter is closed with a soft sealing putty just before the emergence of the laminating resin.

Alternatively one can also proceed in such a way that after the polycarbonate pane is coated in a horizontal position all around with the boundary profile, an excess of the complete binder mixed with all additives is filled in and then the second pane is positioned in place by slowly lowering it in a slanted position, beginning on one side to thereby avoid and eliminate bubbles. Whenever only a very thin adhesive layer is to be produced, one may be able to omit the step of forming the band or boundary of soft material.

The hardening of the adhesive layer takes place most preferably when the laminated package is in a horizontal position. When any bulging of the panes can be prevented by suitable measures, the hardening can also be accomplished when the laminate is in a slanting or a vertical position. For the hardening to be accomplished, generally a time of about 2 to 20 hours is required. The hardening time may be influenced within certain limits by the hardening temperature and/or by the quantity of catalyst used.

The invention is illustrated by the following examples.

EXAMPLE 1

The following ingredients are charged to a round bottom flask fitted with a reflux cooler:

1062 g of 2-ethylhexylmethacrylate, stabilized with 50 ppm of 2,4-dimethyl-6-tertiary butylphenol,
200 g of 2-ethylhexylacrylate, stabilized with 15 ppm of hydroquinone,
230 g of 2-hydroxypropylacrylate, stabilized with 400 ppm of hydroquinone monomethyl ether (MEHQ),
23.5 g of acrylic acid, stabilized with 200 ppm of hydroquinone monomethyl ether (MEHQ), and
4.7 g of glycol dimercaptoacetate.

While stirring, the ingredients are heated to 75° C. by means of a water bath and are then heated further up to 95° to 100° C. after the addition of 0.25 g of azodiisobutyric acid dinitrile (AIBN). As a result of the heat of polymerization, the temperature of the mixture continues to rise to 110° to 120° C. After 50 minutes, counting from the addition of the AIBN, it is cooled down and 100 ppm of 2,4-dimethyl-6-tertiary butylphenol are added. The viscosity of the syrup amounts at +20° C. to 110 cP.

Then the following additional ingredients are added:
15.70 g of acetyltributylcitrate and
31.40 g of triethyleneglycol dimethacrylate.

The density of the binder is measured as 0.92 g/cm³ at +20° C.

For the hardening, the following are added:
0.66 g of phenylethyldibutylaminohydrochloride,
7.20 g of tert. butyl perbenzoate, dissolved in 7.84 g of dibutylphthalate,
15.7 g of γ-mercaptopropyltrimethoxy silane and
3.14 g of a copper naphthenate solution (1 g of copper naphthenate with 10% Cu++ content dissolved in 100 ml of 2-ethylhexylmethacrylate).

The mixture is evacuated in a pressure resistant vessel in order to remove separated and stirred in air.

The evacuated mixture is then poured between a 59.2 × 179.2 cm paneof 6 mm thick silicate glass and a pane of equal size of 1.5 mm thick polycarbonate while the panes are in a slanting position. The panes had previously been cleaned and were sealed with a band approximately 3 mm thick and in round cross section. The band had been extruded from the polymerizate of the batch but without triethylene glycol dimethacrylate which had been previously produced between polyethylene foils in a layer about 12-15 mm thick. The band of material had been placed along the outside edges of the pane except for a filling in opening and the panes had been compressed by clamping strips up to a distance of 1.5 mm.

After about 5 minutes of waiting time in the slanting position for the rising of air bubbles, which had possibly entered during the pouring operation, the composite of panes is lowered and is filled free of bubbles. The filling opening is then closed by means of a soft sealing putty. During the hardening, the laminated panes are stored horizontally on a stable, flat plate with the polycarbonate pane being the lowest one and the silicate pane on top.

After about 5 hours, at ambient temperature, a clear, transparent laminated safety glass is obtained which even after a temperature change between −10° to +50° C. does not change optically.

Using a revolver of 9 mm caliber parabellum, this laminated safety glass could not be pierced whenever the projectile strikes on the side of the silicate glass pane.

EXAMPLE 2

The following ingredients are charged to a round bottom flask with a reflux cooler.

990 g of 2-ethylhexylmethacrylate, stabilized with 50 ppm of 2,4-dimethyl-6-tertiarybutylphenol,
200 g of 2-ethylhexylacrylate, stabilized with 15 ppm of hydroquinone,
230 g of 2-hydroxypropylacrylate, stabilized with 400 ppm of hydroquinone monomethylether (MEHQ),
23.5 g of acrylic acid, stabilized with 200 ppm of hydroquinone monomethylether (MEHQ),
72 g of methylmethacrylate unstabilized, and
4.7 g of glycol dimercaptoacetate.

The ingredients are stirred and are warmed up to 75° C. by means of a water bath and are then heated further up to 95° to 100° C. with the addition of 0.25 g of azodiisobutyric acid dinitrile (AIBN). As a result of the heat of polymerization, the temperature of the mixture continues to rise to 110° to 120° C. After 50 minutes from the addition of the AIBN, the mixture is cooled down and 100 ppm of 2,4-dimethyl-6-tertiary butyl phenol are added. The viscosity of the syrup at +20° C. is about 100 cP.

Thereafter the following ingredients are added:
15.7 g of acetyl tributyl citrate and
31.4 g of triethylene glycol dimethacrylate.

For the hardening operation, the following are added by mixing:
0.66 g of phenylethyl dibutylaminohydrochloride,
7.20 g of tert. butyl perbenzoate, dissolved in 7.84 g dibutylphthalate,
15.7 g of γ-mercaptopropyltrimethoxy silane, and
3.14 g of a copper napthenate solution (1 g of copper naphthenate with 10% Cu++ content dissolved in 100 ml of 2-ethylhexylmethacrylate).

The mixture is evacuated in a pressure resistant vessel in order to remove separated air. The evacuated mixture is then poured between two panes each 58.6 × 178.6 cm in dimension and formed of 10 mm thick silicate glass and 2 mm thick polycarbonate, respectively. The panes are held in a slanting position and were previously cleaned and sealed along the outside edge with an approximately 2 mm thick round string or band made of soft PVC. An opening is left for the filling operation. The panes were compressed together by clamping strips so as to form a space between the panes of 1.5 mm.

After about 5 minutes of holding the panes in a slanting position for the purpose of letting air bubbles escape which might have been poured in along with the material, the laminate of panes is lowered and filled of the material while making certain it is free of bubbles. Then the opening is closed by means of a soft sealing putty. During the hardening operation, the lamainted composite of panes is stored in a horizontal position on a stable flat plate with the polycarbonate side on the bottom and the silicate glass pane on top.

After curing for about 5 hours at ambient temperature, a clear, transparent laminated safety glass will be obtained which does not change in optical properties even after temperature changes between $-10°$ and $+50°$ C. A revolver of 357 caliber magnum is not capable to shoot through this laminated safety glass whenever the projectile strikes on the side of the silicate glass pane.

EXAMPLE 3

The following ingredients are charged to a round bottom flask with a reflux condenser.

- 900 g of 2-ethylhexylmethacrylate, stabilized with 50 ppm of 2,4-dimethyl-6-tertiary butyl phenol,
- 182 g of 2-ethylhexylacrylate, stabilized with 15 ppm of hydroquinone (HQ),
- 208 g of 2-hydroxypropylacrylate, stabilized with 400 ppm of hydroquinone monomethylether (MEHQ),
- 20.7 g of acrylic acid, stabilized with 200 ppm MEHQ,
- 65 g of methylmethacrylate, unstabilized and
- 4.1 g of glycol dimercaptoacetate.

While stirring, the ingredients are warmed up to 75° C. by means of a water bath. The mixture is then heated further to 95° to 100° C. after the addition of 0.25 g of azodiisobutyric acid dinitrile (AIBN). The temperature of the mixture continues to rise to 110° to 120° C. as a result of the heat of polymerization. 50 minutes after the addition of the AIBN, the mixture is cooled down and 100 ppm of 2,4-dimethyl-6-tertiary butylphenol are added. The viscosity of the syrup at $+20°$ C. is measured at about 100 cP.

Then in addition the following are added.
- 156 g of acetyltributylcitrate and
- 31.4 g of triethylene glycol dimethacrylate.

For the hardening operation, the following are added by mixing:
- 0.66 g of phenylethyl dibutylaminohydrochloride,
- 7.20 g of tert. butyl perbenzoate, dissolved in 7.84 g of dibutylphthalate,
- 15.7 g of γ-mercaptopropyltrimethoxy silane and
- 3.14 g of a copper naphthenate solution (1 g of copper naphthenate with 10% $Cu^{++}$ content dissolved in 100 ml of 2-ethylhexylmethacrylate).

The mixture is evacuated in a pressure resistant vessel in order to remove separated and stirred in air.

Two plates each of 58.8 × 178.8 cm in dimension, one made of 10 mm thick silicate glass and the other made of 2.0 mm thick polycarbonate glass are cleaned and then sealed with a soft PVC hose (outside diameter 2.5 mm and thickness of wall of 0.5 mm) along the outside edges of the panes. The panes are then clamped together so that the space between is 1.5 mm. Clamping strips are used to compress the panes together. An opening is left to permit the filling operation with the adhesive mixture. The panes are arranged in a slanting position and the evacuated mixture is then poured into the opening between the panes.

After a waiting time of about 5 minutes in a slanting position in order for any possibly poured in air bubbles to escape, the planes are lowered and filled free of bubbles. The filling opening is closed by means of a soft sealing putty.

During the hardening period, the laminated safety glass package is stored in a horizontal position on a stable flat plate with the polycarbonate side bottom most and the silicate glass pane on top.

After storage for about 5 hours at ambient temperature, a clearly transparent laminated pane is obtained. The laminated product was subjected to changes of temperature between $-10°$ to $+50°$ C. and did not undergo any change in optical properties. A shot from a revolver of 357 caliber magnum does not pierce this laminated safety glass whenever the projectile strikes on the side of the silicate glass pane.

EXAMPLE 4

The following ingredients are charged to a round bottom flask fitted with a reflux condenser.

- 1030 g of 2-ethylhexylmethacrylate, stabilized with 50 ppm of 2,4-dimethyl-6-tertiary butylphenol,
- 197 g of 2-ethylhexylacrylate, stabilized with 15 ppm of hydroquinone,
- 224 g of 2-hydroxypropylacrylate, stabilized with 400 ppm of hydroquinone monomethyl ether,
- 21.9 g of methacrylic acid, stabilized with 200 ppm of hydroquinone monomethyl ether, and
- 4.4 g of glycol dimercaptoacetate.

The ingredients are warmed up to 75° C. in the flask by means of a water bath and then after addition of 0.25 g of azodiisobutyric acid dinitrile (AIBN) the mixture is heated further to 95° to 100° C. The temperature of the mixture continues to rise to 110° to 120° C. as a result of the heat of polymerization. 50 minutes after the addition of AIBN, the mixture is cooled down and 100 ppm of 2,4-dimethyl-6-tertiary butylphenol are added. The viscosity of the syrup at $+20°$ C. is about 110 cP.

Then the following additional ingredients are added:
- 78.5 g of acetyltributyl citrate and
- 31.4 g of triethylene glycol dimethacrylate.

For the hardening operation the following are added by mixing:
- 0.66 g of phenylethyl dibutylaminohydrochloride,
- 7.20 g of tert. butylperbenzoate, dissolved in 7.84 g of dibutylphthalate,
- 15.79 g of γ-mercaptopropyltrimethoxy silane and
- 3.14 g of a copper naphthenate solution (1 g of copper naphthenate with 10% $Cu^{++}$ content dissolved in 100 ml of 2-ethylhexylmethacrylate).

The mixture is evacuated in a pressure resistant vessel in order to remove separated and stirred in air.

Two panes each of 58.8 × 178.8 cm in dimension are used, one made of 10 mm thick silicate glass and the other, 2.0 mm thick polycarbonate. The panes have been previously cleaned and are sealed along the outside edges, except for the filling opening, with a soft PVC hose (outside diameter 2.5 mm and thickness of wall of 0.5 mm). The panes are compressed by clamping strips to form a space 1.5 mm between the panes. The evacuated mixture is then poured in between the panes while the composite is held in a slanting position.

After waiting about 5 minutes with the panes in a slanted position for the purpose of permitting any entrapped air bubbles to escape, the panes are lowered and free of bubbles. The filling opening is closed by means of a soft sealing putty.

During the hardening operation, the laminated package is stored in a horizontal position on a stable flat plate with the polycarbonate pane on the bottom and the silicate glass pane on top.

After the laminated product is held about 5 hours at ambient temperature, there is obtained a clear, transparent laminated safety glass which does not undergo optical variations after a change of temperature between −10° to +50° C. This laminated safety glass is not pierced by a revolver bullet of 357 caliber magnum when the bullet strikes on the side of the silicate glass pane.

EXAMPLE 5

The following ingredients are charged to a round bottom flask with a reflux condenser.
  589 g of 2-ethylhexylmethacrylate, stabilized with 50 ppm of 2,4-dimethyl-6-tertiary butyl phenol,
  119 g of 2-ethylhexylacrylate, stabilized with 15 ppm of hydroquinone,
  136 g of 2-hydroxypropylacrylate, stabilized with 400 ppm of hydroquinone monomethyl ether (MEHQ),
  13.6 g of acrylic acid, stabilized with 200 ppm MEHQ,
  42.4 g of methylmethacrylate unstabilized, and
  2.7 g of glycol dimercaptoacetate.

While stirring, the ingredients are warmed up to 75° C. by means of a water bath and then after addition of 0.20 g of azodiisobutyric acid dinitrile (AIBN) the ingredients are heated further to 95° to 100° C. The temperature of the mixture rises to 110° to 120° C. as a result of the heat of polymerization. After 50 minutes from the addition of AIBN, the mixture is cooled down and 100 ppm of 2,4-dimethyl-6-tertiary butylphenol are added. The viscosity of the syrup at +20° C. is about 80 cP.

Then the following are added:
  48.4 g of dibutylphthalate and
  19.4 g of triethylene glycol dimethacrylate.

For the hardening the following are added:
  0.41 g of phenylethyl dibutylaminohydrochloride,
  4.17 g of tert. butylperbenzoate dissolved in 4.87 g of dibutylphthalate,
  9.7 g of γ-mercaptopropyltrimethoxy silane and
  2.0 g of a copper naphthenate solution (1 g of copper naphthenate with 10% $Cu^{++}$ content dissolved in 100 ml methylmethacrylate).

The mixture is evacuated in a pressure resistant vessel in order to remove separated and stirred in air. Two panes each of a dimension 80.6 × 120.6 cm one made of 10 mm thick silicate glass and one 2.0 mm thick polycarbonate after previous cleaning are sealed together along their outside edges except for the filling opening with a 2 mm thick round string or band of silicon rubber. The two panes are compressed by clamping strips to form a cavity there between having a thickness of 1.0 mm. This composite is held in a slanting position and the evacuated mixture is then poured into the cavity.

After waiting about 5 minutes with the panes in a slanted position for the purpose of permitting entrapped air bubbles to escape, the panes are lowered and filled in a bubble free manner and the filling opening is closed by means of a soft sealing putty. During the hardening, the laminated package is stored in a horizontal position on a stable flat plate with the polycarbonate pane on the bottom and the silicate glass pane on top.

After the laminated product is held for about 5 hours at ambient temperature there is obtained a clear, transparent laminated pane which does not change in optical characteristics even after temperature changes of between −10° to +50° C. Further, this laminated safety glass is not pierced by a revolver bullet of the 357 caliber magnum, whenever said bullet strikes the side of the silicate glass pane.

EXAMPLE 6

The following ingredients
  1090 g of 2-ethylhexylmethacrylate, stabilized with 50 ppm of 2,4-dimethyl-6-tertiary butylphenol,
  149 g of 2-ethylhexylacrylate, stabilized with 15 ppm of hydroquinone,
  149 g of 2-hydroxypropylacrylate, stabilized with 400 ppm of hydroquinone monomethyl ether (MEHQ),
  22 g of acrylic acid, stabilized with 200 ppm MEHQ,
  74 g of methylmethacrylate unstabilized, and
  7 g of isooctylthioglycolate are warmed to 75° C. in a round flask with stirring on a reflux condenser by means of a water bath. After the addition of 0.25 g of azodiisobutyric acid dinitrile (AIBN), the contents are heated further to 95° to 100° C. The temperature of the mixture rises further to 110° to 120° C. as a result of the heat of polymerization. After 50 minutes from the addition of the AIBN, the mixture is cooled down and 100 ppm MEHQ are added. The viscosity of the syrup at +20° C. is about 80 cP.

When the following additional ingredients are added:
  47.1 g of acetyltributyl citrate and
  31.4 g of trimethylolpropanetrimethacrylate.

The density of the binder is 0.92 $g/cm^3$ at +20° C. For the hardening reaction, the following ingredients are mixed and added:
  0.66 g of phenylethyl dibutylaminohydrochloride and
  7.20 g of tert. butylperbenzoate, dissolved in 7.84 g of dimethylphthalate,
  15.7 g of γ-mercaptopropyltrimethoxy silane,
  3.2 g of a copper naphthenate solution (1 g of copper naphthenate with 10% $Cu^{++}$ content dissolved in 100 ml methylmethacrylate).

The mixture is evacuated in a pressure resistant vessel in order to remove separated and stirred in air. Two panes each 59.2 × 179.2 cm in dimension one being 10 mm thick silicate glass and the other being 2 mm thick polycarbonate which were previously cleaned are sealed along their outside edges except for a filling opening. The sealing material is an approximately 3 mm thick round string or band formed of the polymerizate of the batch but without trimethylol propane trimethacrylate which had been produced previously between the polyethylene foil in a layer about 12 - 15 mm thick. The panes were then compressed by clamping strips to form a cavity with a thickness of 1.5 mm. With the panes held in a slanting position, the evacuated mixture is poured into the cavity between the panes.

After waiting about 5 minutes while permitted entrapped air bubbles to escape and with the panes still in the slanting position, the panes are lowered and filled free of bubbles and the filling opening is closed by means of a soft sealing putty. During the hardening, the laminated panes are stored in a horizontal position on a stable, flat plate with the polycarbonate pane being the lower one and the silicate pane being the upper surface.

After curing for about 5 hours at ambient temperature, a clearly transparent laminated pane is obtained which cannot be pierced by a revolver bullet of the 357 caliber magnum whenever the bullet strikes the side of the silicate glass pane.

EXAMPLE 7

The following ingredients are charged to a round bottom flask with a reflux condenser.

486 g of 2-ethylhexylmethacrylate, stabilized with 50 ppm of 2,4-dimethyl-6-tertiary butylphenol, 94 g of 2-ethylhexylacrylate, stabilized with 15 ppm of hydroquinone, 108 g of 2-hydroxypropylacrylate, stabilized with 400 ppm of hydroquinone monomethyl ether (MEHQ), 10 g of acrylic acid, stabilized with 200 ppm MEHQ, and 2 g of octylmercaptan.

The mixture is warmed to 75° C. while stirring, by means of a water bath. After addition of 0.20 g of azodiisobutyric acid dinitrile (AIBN), the mixture is heated further to 95° to 100° C. The temperature of the mixture rises to 110° to 120° C. as a result of the heat of polymerization. After 40 minutes from the addition of the AIBN, another 0.10 g of AIBN are added, then after another 20 minutes the mixture is cooled and 100 ppm MEHQ are added. The viscosity of the syrup at +20° C. is about 1200 cP.

For the purpose of thinnning to a more favorable pouring viscosity the following ingredients are added:

486 g of 2-ethylhexylmethacrylate, stabilized with 50 ppm of 2,4-dimethyl-6-tertiary butylphenol, 94 g of 2-ethylhexylacrylate, stabilized with 15 ppm of hydroquinone, 108 g of 2-hydroxypropylacrylate, stabilized with 400 ppm of hydroquinone monomethyl ether (MEHQ), and 10 g of acrylic acid, stabilized with 200 ppm MEHQ.

The viscosity of the syrup is then about 20 cP at +20° C.

For the final mixing of the binder 15 g of acetyltributyl citrate and 45 g of hexandiolediacrylate are added.

For the hardening, the following ingredients are added to the mixture:

0.61 g of phenylethyl dibutylaminohydrochloride, 6.7 g of tert. butylperbenzoate dissolved in 7.3 g of dibutylphthalate, 14.6 g of γ-mercaptopropyltrimethoxy silane and 2.9 of a copper naphthenate solution (1 g of copper naphthenate with 10% $Cu^{++}$ content dissolved in 100 ml of 2-ethylhexylmethacrylate).

The mixture is evacuated in a pressure resistant vessel in order to remove separated and stirred in air.

For the production of two laminated panes the completed evacuated mixture is divided into 2 × 746 g. In the case of laminated pane 1, the mixture is poured between two panes each of a size of 61.2 × 121.2 cm; one being made of 12 mm thick acrylic glass and the other being 2 mm thick polycarbonate. In the case of laminated pane 2, two panes each of a size of 61.2 × 121.2 cm; one being made of 25 mm thick acrylic glass and the other being 2 mm thick polycarbonate. Both laminated panes 1 and 2 are held in a slanting position. All panes were previously cleaned. Each set of panes had been previously sealed along their outside edges with an about 3 mm thick extruded round band of the polymerizate of the batch excluding hexanedioldiacrylate. The round band was previously produced between polyethylenefoil in a layer of about 12 – 15 mm thickness. An opening was left in the sealing band for filling operation. The panes, after sealing, were compressed by clamping strips to form a space of 1.5 mm between the panes.

After waiting about 5 minutes with the panes held in the slanting position in order to let any entrapped air bubbles escape, the panes are lowered and filled free of bubbles and the filling opening is closed by means of a soft sealing putty. During the hardening the two composites of panes are stored in a horizontal position on a stable flat plate with the polycarbonate pane on the bottom and the acrylic glass pane on top.

After curing for about 4 hours at ambient temperature one will obtain clear transparent laminated safety glass panes.

A bullet from a pistol of 9 mm caliber parabellum will not pierce pane 1 with the 12 mm thick acrylic glass whenever the bullet strikes the side of the acrylic glass pane.

Even a revolver bullet with 357 caliber magnum will not pierce pane 2 with the 25 mm thick acrylic glass whenever the bullet strikes the side of the acrylic glass pane.

EXAMPLE 8

The following ingredients were changed to a round bottom flask with a reflux condenser:

510 g of 2-ethylhexylmethacrylate, stabilized with 50 ppm of 2,4-dimethyl-6-tertiary butylphenol, 100 g of 2-ethylhexylacrylate, stabilized with 15 ppm of hydroquinone, 114 g of 2-hydroxypropylacrylate, stabilized with 400 ppm of hydroquinone monomethyl ether (MEHQ), 11 g of acrylic acid, stabilized with 200 ppm MEHQ, and 2.2 g of glycol dimercaptoacetate.

While stirring the ingredients are heated to 75° C. by means of a water bath and are then heated further, after the addition of 0.20 g of azodiisobutyric acid dinitrile (AIBN), to 95° to 100° C. As a result of the polymerization heat, the temperature of the mixture rises to 110° to 120° C. After 50 minutes from the addition of AIBN, the batch is cooled and 100 ppm of MEHQ are added. At +20° C., the viscosity of the syrup is about 80 cP.

Then the following additional ingredients are added:

7.6 g of acetyltributyl citrate and 15.2 g of triethylene glycol dimethacrylate.

For the hardening the following ingredients are added:

0.32 g of phenylethyl dibutylaminohydrochloride, 3.5 g of tert. butylperbenzoate, dissolved in 3.8 g of dibutylphthalate, 7.6 g of γ-mercaptopropyltrimethoxy silane and 1.5 g of a copper naphthenate solution (1 g of copper with 10% $Cu^{++}$ content dissolved in 100 ml of 2-ethylhexylmethacrylate).

The mixture is evacuated in a pressure resistant vessel in order to remove separated and stirred in air. The evacuated mixture is then poured between a commercial laminated pane of the size of 52.4 × 52.4 cm, made of 2 × 12 mm silicate glass and a polycarbonate pane with an improved surface on one side, of equal size and 4 mm thick. The panes are held in a slanted position. The panes had been previously cleaned and sealed along their outside edges, except for a filling opening, with an approximately 6 mm thick, extruded round band formed of the polymerizate of the batch but excluding triethylene glycol dimethacrylate. This had been produced previously between polyethylene foil. The panes were compressed by clamping strips to form a space between the panes of 3 mm. The side of the polycarbonate with the improved surface in this case is arranged as the outside.

After waiting about 5 minutes with the panes in slanted position for the purpose of letting any air bubbles escape which might possibly have entered with the pouring in of the material, the panes are lowered and filled free of bubbles and the fill opening is closed by means of a soft sealing putty. During the hardening, the laminated combination is stored in a horizontal position on a stable flat plate with the polycarbonate pane on the bottom and the silicate glass pane on top.

After curing for about 5 hours at ambient temperature, a clear transparent laminated pane is obtained which does not change in optical properties even after a temperature change of between $-10°$ to $+50°$ C.

A long range gun of 7.62 mm caliber does not pierce this laminated pane, whenever the projectile strikes on the silicate glass side.

EXAMPLE 9

The following ingredients are charged to a round bottom flask with a reflux condenser:
- 510 g of 2-ethylhexylmethacrylate, stabilized with 2,4-dimethyl-6-tertiary butyl phenol (50 ppm),
- 100 g of 2-ethylhexylacrylate, stabilized with 15 ppm of hydroquinone,
- 114 g of 2-hydroxypropylacrylate, stabilized with 400 ppm of hydroquinone monomethyl (MEHQ),
- 11 g of acrylic acid, stabilized with 200 ppm MEHQ, and
- 2.2 g of glycol dimercaptoacetate.

The ingredients are warmed to 75° C. while stirring, by means of a water bath. After the addition of 0.20 g of azodiisobutyric acid dinitrile (AIBN) the mixture is heated further to 95° to 100° C. As a result of the heat of polymerization, the temperature of the mixture rises to 110° to 120° C. After 50 minutes from the addition of the AIBN, the mixture is cooled down and 100 ppm of MEHQ are added. At 3020° C. the viscosity of the syrup is about 80 cP.

Then the following additional ingredients are added:
- 7.6 g of acetyltributylcitrate,
- 15.2 g of triethylene glycol dimethacrylate, and
- 1.5 g of a copper naphthenate solution (1 g of copper naphthenate with 10% $Cu^{++}$ content dissolved in 100 ml of 2-ethylhexylmethacrylate).

The binder is also capable of being stored with the addition of copper naphthenate for some time at ambient temperature in closed dark containers.

For the hardening reaction, the following ingredients are added and mixed in:
- 0.32 g of phenylethyl dibutylaminohydrochloride,
- 3.5 g of tert. butylperbenzoate, dissolved in 3.8 g of dibutylphthalate, and
- 7.6 g of γ-mercaptopropyltrimethoxy silane.

The mixture is evacuated in a pressure resistant vessel in order to remove separated and stirred in air. The evacuated mixture is then poured into the space between two panes each of 51.5 × 51.4 cm in dimension; one made of 12 mm thick silicate glass and the other made of 3 mm thick polycarbonate. The panes are mounted in a slanted position. They had been previously cleaned and sealed along their outside edges except for a filling opening with a soft PVC hose approximately 5 mm thick (thickness of the wall 0.8 mm). The panes had been compressed by clamping strips to form a space between panes of 3 mm.

After waiting about 5 minutes while the panes are in a slanting position for the purpose of letting air bubbles escape that may have possibly entered during the pouring in of the material, the panes are lowered and filled free of bubbles and the filling opening is closed by means of a soft sealing putty.

During the hardening process, the pane composite is stored in a horizontal position on a stable plate with the polycarbonate pane on the bottom and the silicate glass pane on top.

After curing for about 5 hours at ambient temperature a clear transparent laminated pane is obtained which is not pierced by the bullet from a pistol of 44 caliber magnum whenever the projectile strikes on the silicate glass side.

EXAMPLE 10

The following ingredients were charged to a round bottom flask with a reflux condenser:
- 255 g of 2-ethylhexylmethacrylate, stabilized with 2,4-dimethyl-6-tertiary butylphenol (50 ppm),
- 50 g of 2-ethylhexylacrylate, stabilized with 15 ppm of hydroquinone,
- 57 g of 2-hydroxypropylacrylate, stabilized with 400 ppm of hydroquinone monomethyl ether (MEHQ),
- 5.5 g of acrylic acid stabilized with 200 ppm MEHQ, and
- 1.1 g of glycol dimercaptoacetate.

The ingredients were warmed up to 75° C. while stirring by means of a water bath. After the addition of 0.20 g of azodiisobutyric acid dinitrile (AIBN) the mixture is heated further to 95° to 100° C. As a result of the heat of polymerization, the temperature of the mixture rises to 110° to 120° C. After 50 minutes from the addition of the AIBN the mixture is cooled down and 100 ppm of MEHQ are added. At +20° C., the viscosity of the syrup is 500 cP.

Then the following additional ingredients are added:
- 3.8 g of acetylributylcitrate and
- 7.6 g of triethylene glycol dimethacrylate.

For the hardening the following are mixed in:
- 0.16 g of phenylethyl dibutylaminohydrochloride,
- 1.7 g of tert. butylperbenzoate dissolved in 1.9 g of dibutylphthalate,
- 3.8 g of γ-mercaptopropyltrimethoxy silane and
- 0.75 g of a copper naphthenate solution (1 g of copper naphthenate with 10% $Cu^{++}$ dissolved in 100 ml of 2-ethylhexylmethacrylate).

The mixture is evacuated in a pressure resistant vessel in order to remove separated and stirred in air.

The evacuated mixture free of bubbles, is then poured into the middle of a clean 10 mm thick glass pane of the size of 50 × 50 cm, which is supported so that the longitudinal edges will stand freely. After about 2 minutes, the resin has been uniformly distributed on the larger part of the glass surface. At the four corners, a thin wire 0.1 to 0.2 mm thick and about 2 mm long is placed as a spacing onto the glass pane. Now a polycarbonate pane of the same size but only 2 mm thick, and which had previously likewise been cleaned, is positioned in place on top of the glass pane. The polycarbonate pane is first slightly bowed or bent in the middle of the pane and then the remaining part of the polycarbonate pane is unbowed or unbent slowly without entrapping any bubbles. The excess resin will flow out at the four longitudinal sides of the pane and may be collected in a suitable receptacle made of polyethylene or aluminum foil.

In order to avoid deformations of the polycarbonate pane during the hardening, an acrylic glass pane of about 10 mm thick and of equal size is put on top as a weight.

After curing for about 10 hours at ambient temperature a clear transparent laminated pane will be obtained which is not pierced by the bullet from a pistol of 357 caliber magnum, whenever the projectile strikes on the silicate glass pane.

EXAMPLE 11

The following ingredients are charged to a round bottom flask with a reflux condenser:
- 340 g of 2-ethylhexylmethacrylate, stabilized with 2,4-dimethyl-6-tertiary butyl phenol (50 ppm),
- 67 g of 2-ethylhexylacrylate, stabilized with 15 ppm of hydroquinone,
- 76 g of 2-hydroxypropylacrylate, stabilized with 400 ppm of hydroquinone monomethyl ether (MEHQ),
- 7.3 g of acrylic acid, stabilized with 200 ppm MEHQ, and
- 1.5 g of glycol dimercaptoacetate.

The ingredients are warmed up to 75° C. while stirring, by means of a water bath. After the addition of 0.15 g of azodiisobutyric acid dinitrile (AIBN) the mixture is heated further to 95° to 100° C. As a result of the heat of polymerization, the temperature of the mixture rises to 110° to 120° C. After 50 minutes from the addition of the AIBN, the mixture is cooled down and 100 ppm of MEHQ are added. At +20° C. the viscosity of the syrup is 100 cP.

Then the following additional ingredients are added:
- 5.0 g of acetyltributylcitrate and
- 10.2 g of triethylene glycol dimethacryate.

For the hardening the following ingredients are mixed in:
- 0.042 g of phenylethyl dibutylaminohydrochloride,
- 0.46 g of tert. butylperbenzoate dissolved in 0.5 g of dibutylphthalate,
- 5.0 g of γ-mercaptopropyltrimethoxy silane, and
- 1.0 g of a copper naphthenate solution (1 g of copper naphthenate with 10% $Cu^{++}$ content dissolved in 100 ml of 2-ethylhexylmethacrylate).

The mixture is evacuated in a pressure resistant vessel in order to remove separated and stirred in air.

The evacuated mixture is then poured into the space between a 10 mm thick silicate glass pane of 50 × 50 size and a 2 mm thick polycarbonate pane of equal size. The panes are held in a slanting position. Previously the panes had been cleaned and sealed with a 3 mm thick soft PVC round band along the outside edges except for a filling opening. The panes are compressed by clamping strips to form a space of 2 mm between the panes.

After waiting about 5 minutes while the panes are in slanted position in order to allow air bubbles to escape which might possible have been poured in along with the material, the panes are lowered and filled free of bubbles and the filling opening is closed by means of a soft sealing putty. During the hardening, which is accomplished in a heating chamber at +50° C. the laminated combination is stored in a horizontal position on a stable flat plate with the polycarbonate side on the bottom and the silicate glass pane on top.

After curing for about 3 hours at +50° C., one will obtain a clear, transparent laminated pane which is not pierced by the bullet from a revolver of 357 caliber magnum, whenever the projectile strikes the silicate glass pane.

EXAMPLE 12

The following ingredients are charged to a round bottom flask with a reflux condenser:
- 510 g of 2-ethylhexylmethacrylate, stabilized with 2,4-dimethyl-6-tertiary butyl phenol (50 ppm),
- 100 g of 2-ethylhexylacrylate, stabilized with 15 ppm of hydroquinone,
- 114 g of 2-hydroxypropylacrylate, stabilized with 400 ppm of hydroquinone monomethyl ether (MEHQ),
- 11 g of acrylic acid, stabilized with 200 ppm of MEHQ, and
- 2.2 g of glycol dimercaptoacetate.

The ingredients are warmed up to 75° C. while stirring, by means of a water bath. After the addition of 0.20 g of azodiisobutyric acid dinitrile (AIBN) the mixture is heated further to 95° to 100° C. As a result of the heat of polymerization the temperature of the mixture rises to 110° to 120° C. After 50 minutes from the time of addition of the AIBN, the mixture is cooled and 100 ppm of MEHQ are added. At +20° C. the viscosity of the syrup is about 80 cP.

Then the following additional ingredients are added:
- 7.6 g of acetyltributylcitrate,
- 15.2 g of triethylene glycol dimethacrylate, and
- 1.5 g of a copper naphthenate solution (1 g of copper naphthenate with 10% $Cu^{++}$ content dissolved in 100 ml of 2-ethylhexylmethacrylate).

The binder is storable even with the addition of copper naphthenate for some time at ambient temperature in closed dark containers.

For the hardening reaction the following are mixed in:
- 0.32 g of phenylethyl dibutylaminohydrochloride,
- 3.5 g of tert. butylperbenzoate dissolved in 3.8 g of dibutylphthalate,
- 0.38 g of γ-mercaptopropyltrimethoxy silane.

The mixture is evacuated in a pressure resistant vessel in order to remove separated and stirred in air.

The evacuated mixture is then poured into the space between two panes, each 51.5 × 51.4 cm; one being 12 mm thick silicate glass and the other being 3 mm thick polycarbonate. The panes are held in a slanted position. The panes were previously cleaned and sealed along their outside edges except for a filling opening with a soft PVC hose (about 5 mm thick wall thickness 0.8 mm). The panes were compressed by clamping strips to form a space of 3 mm between the panes.

After waiting about 5 minutes with the panes in the slanted position in order to allow air bubbles to escape the panes lowered and filled free of bubbles. The filling opening is closed by means of a soft sealing putty. During the hardening the composite of panes is stored in a horizontal position on a stable plate with the polycarbonate pane on the bottom and the silicate glass pane on top.

After curing for about 5 hours at ambient temperature, one will obtain a clear transparent laminated pane which a pistol bullet of 44 caliber magnum does not pierce whenever the projectile strikes on the silicate glass side.

Further embodiments, variations and modifications of the foregoing invention will be apparent to those skilled in the art and are intended to be encompassed by the claims appended hereto.

We claim:

1. A bulletproof laminated safety glass comprising:
   (1) a silicate glass pane of at least 6 mm thickness provided for the side of the laminated safety glass endangered by bombardment, or an acrylic glass pane of at least 12 mm thickness; and
   (2) a polycarbonate pane of at least 1.5 mm thickness which is thin relative to the silicate glass or acrylic pane, and which is provided for the rear side of the combination said glass pane and said polycarbonate pane being secured together along their planar surface area by an adhesive layer, which is produced in situ by hardening at temperatures between +10° and +50° C. of a binder which comprises in the uncured state at least 50% by weight from 2-ethylhexylmethacrylate, 0.2 to 2.0% by weight of the binder of at least one alkylacylperoxide and 0.005 to 0.5% by weight of the binder at least a compound which contains a labile halogen atom, as a solution in a phlegmatization agent, 0.01 to 10 ppm $Cu^{++}$-ions in the form of a copper salt, soluble in the binder, and 0.05 to 3% by weight of said binder of a ω-mercaptoalkyl-trialkoxy silane.

2. A bulletproof laminated safety glass as in claim 1 wherein the silicate glass pane is 6 mm in thickness and the polycarbonate pane is of 2 mm thickness.

3. A bulletproof laminated safety glass as in claim 1 wherein the silicate glass pane is 10 mm in thickness and the polycarbonate pane is of 2 mm thickness.

4. A bulletproof laminated safety glass as in claim 1 wherein the silicate glass pane is 12 mm in thickness and the polycarbonate pane is of 3 mm thickness.

5. A bulletproof laminated safety glass as in claim 1 wherein the silicate glass is a laminated pane of 2 × 12 mm silicate glass and the polycarbonate pane is of 4 mm thickness.

6. A bulletproof laminated safety glass as in claim 1 wherein the acrylic glass pane is 25 mm in thickness and the polycarbonate pane is of 2 mm thickness.

7. A bulletproof laminated safety glass as in claim 1 wherein the polycarbonate pane is coated by a thin scratch resistant coating or covered with a thin foil or pane made of silicate glass.

8. A bulletproof laminated safety glass as in claim 1 wherein the binder has the following composition:
   (a) 98.9 to 77% by weight of a methacrylate syrup containing on the basis of the total weight of the methacrylate syrup;
      65 to 85% by weight of 2-ethylhexylmethacrylate,
      5 to 20% by weight of 2-ethylhexylacrylate,
      5 to 20% by weight of 2-hydroxypropylacrylate,
      0 to 5% by weight of other alkyl esters of the acrylic and/or methacrylic acid,
      0.1 to 3% by weight of acrylic and/or methacrylic acid; and
      0.05 to 0.5% by weight of at least one chain transmitter containing mercapto groups for the polymerization of methacrylate compounds which contains about 20 to 45% of the above mentioned monomers in a polymer form.
   (b) 1 to 20% by weight of at least one plasticizer for methacrylate resin, and
   (c) 0.1 to 3% by weight of at least one cross-linking agent for methacrylate resin;
      whereby the components (a) to (c) add up to 100% by weight.

9. A process for the production of a laminated safety glass comprising providing a silicate glass pane of at least 6 mm thickness or an acrylic glass pane of at least 12 mm thickness for the side of the laminated safety glass endangered by bombardment, and further providing a polycarbonate pane of at least 1.5 mm thickness which is thin relative to the silicate glass or acrylic pane, and which is provided for the rear side of the laminates safety glass, positioning said panes in parallel relationship and connecting said panes by means of an adhesive layer, which is an adhesive layer produced in situ by hardening of a binder comprising at least 50% by weight 2-ethylhexylmethacrylate, 0.2 to 2.0% by weight of at least one alkylacylperoxide and 0.005 to 0.5% by weight of at least a compound which contains a labile halogen atom, as a solution in a phlegmatization agent, 0.01 to 10 ppm $Cu^{++}$-ions in the form of a copper salt, soluble in the binder and 0.05 to 3% by weight of a ω-mercaptoalkyl-trialkoxy silane, all weight being by weight of the binder, said binder hardening at a temperature between +10 and +50° C.

10. A process as defined in claim 1 wherein a silicate glass pane of 6 mm thickness and a polycarbonate pane of 2 mm thickness is used.

11. A process as defined in claim 1 wherein a silicate glass pane of 10 mm thickness and a polycarbonate pane of 2 mm thickness is used.

12. A process as defined in claim 1 wherein a silicate glass pane of 12 mm thickness and a polycarbonate pane of 3 mm thickness is used.

13. A process as defined in claim 1 wherein a pane of 2 × 12 mm silicate glass and a pane of polycarbonate pane of 4 mm thickness is used.

14. A process as defined in claim 1 wherein an acrylic glass pane of 25 mm thickness and a polycarbonate pane of 2 mm thickness is used.

15. A process as defined in claim 1 wherein a polycarbonate pane is used which is protected against scratching on the outside by a thin scratch resistant coating or which is covered with a thin foil or pane made of silicate glass.

16. A process as defined in claim 1 wherein a binder of the following composition is used:
   (a) 98.9 to 77% by weight of a methacrylate syrup containing on the basis of
      the total weight of the methacrylate syrup:
      65 to 85% by weight of 2-ethylhexylmethacrylate,
      5 to 20% by weight of 2-ethylhexylacrylate,
      5 to 20% by weight of 2-hydroxypropylacrylate,
      0 to 5% by weight of other alkyl esters of the acrylic and/or methacrylic acid,
      0.1 to 3% by weight of acrylic and/or methacrylic acid, and
      0.05 to 0.5% by weight of at least one chain transmitter containing mercapto groups for the polymerization of methacrylate compounds; which contains about 20 to 45% of the above mentioned monomers in a polymer form,
   (b) 1 to 20% by weight of at least one plasticizer for methacrylate resin, and
   (c) 0.1 to 3% by weight of at least one cross-linking agent for methacrylate resin;
      whereby the components (a) to (c) add up to 100% by weight.